(12) United States Patent
Nichols et al.

(10) Patent No.: US 6,369,755 B1
(45) Date of Patent: *Apr. 9, 2002

(54) INTEGRATED SATPS TOTAL SURVEY STATION

(75) Inventors: Mark Nichols, Sunnyvale; Nicholas C. Talbot, San Jose, both of CA (US)

(73) Assignee: Trimble Navigation Limited, Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/963,011

(22) Filed: Nov. 3, 1997

Related U.S. Application Data

(63) Continuation of application No. 08/546,929, filed on Oct. 23, 1995, now abandoned.

(51) Int. Cl.[7] .................................................. G01S 5/14
(52) U.S. Cl. ............................ 342/357.17; 342/357.03; 342/357.08
(58) Field of Search ........................... 342/357, 357.06, 342/357.03, 357.08, 357.09, 357.17; 701/213

(56) References Cited

U.S. PATENT DOCUMENTS

| | | | |
|---|---|---|---|
| 4,949,089 A | * 8/1990 | Ruszkowski, Jr. et al. | 342/357 |
| 5,055,666 A | * 10/1991 | Miyahara | 356/152 |
| 5,233,357 A | * 8/1993 | Ingesand et al. | 342/352 |
| 5,313,409 A | * 5/1994 | Wiklund et al. | 364/556 |
| 5,379,045 A | * 1/1995 | Gilbert et al. | 342/357 |
| 5,469,175 A | * 11/1995 | Boman | 342/357 |
| 5,471,218 A | * 11/1995 | Talbot et al. | 342/357 |
| 5,475,395 A | * 12/1995 | Nakamura et al. | 343/720 |
| 5,528,518 A | * 6/1996 | Bradshaw et al. | 364/561 |
| 5,612,864 A | * 3/1997 | Henderson | 364/167.01 |
| 5,734,348 A | * 3/1998 | Aoki et al. | 342/357.17 |
| 5,781,150 A | * 7/1998 | Noris | 342/357 |

FOREIGN PATENT DOCUMENTS

| | | | |
|---|---|---|---|
| JP | 9-068428 | * 3/1997 | G01C/5/14 |
| JP | 9-079853 | * 3/1997 | G01C/5/14 |

OTHER PUBLICATIONS

Blackwell, "Overview of Differential GPS Methods", Global Positioning System. vol. 3, The Institute of Navigation, 1986.*

* cited by examiner

Primary Examiner—Gregory C. Issing

(57) ABSTRACT

Apparatus for measuring surveying parameters, such as distances and angular displacements between an instrument survey station and a mobile survey station, with improved accuracy. The invention combines a differential satellite positioning system (DSATPS), available with positioning systems such as GPS and GLONASS, with electromagnetic measurements of distances and optically encoded angles by a conventional electro-optical survey instrument to provide survey measurements that can be accurate to within a few millimeters in favorable situations. The DSATPS relies upon pseudorange measurements or upon carrier phase measurements, after removal of certain phase integer ambiguities associated with carrier phase SATPS signals. The SATPS may be retrofitted within the housing of the conventional electro-optical instrument. In a first approach, a remote station provides DSATPS corrections for the mobile station and/or for the instrument station. In a second approach, the mobile station provides DSATPS corrections for itself and for the instrument station. In a third approach, the instrument station provides DSATPS corrections for itself and for the mobile station.

5 Claims, 10 Drawing Sheets

Mobile Station Subsystem

INTEGRATED SATPS TOTAL SURVEY STATION

This application is a continuation of a patent application "Improvements On An Integrated SATPS Total Survey Station", U.S. Ser. No. 08/546,929 filed on Oct. 28, 1995 now abandoned, assigned to the assignee of this patent application. This invention relates to surveying and to the use of Satellite Positioning System information to improve the accuracy and productivity of such surveying.

FIELD OF THE INVENTION

BACKGROUND OF THE INVENTION

As noted by A. Bannister and S. Raymond in *Surveying*, Pitman Publishing Ltd., London, 1977, the general notion of surveying was known and practiced more than 2000 years ago. The methods used at that time were simple but subject to consistency errors and required considerable time to perform. Surveying instruments have improved considerably since about 1900, taking advantage of advances in electronics, optics and other related disciplines. Recently, lasers, electro-optics, wave interaction and phase detection have been introduced into, and used in, surveying activities.

Use of a laser beam projector for surveying operations is disclosed in U.S. Pat. No. 3,471,234, issued to Studebaker. The beam rotates over terrain to be surveyed, and a beam point may be directed to a particular location and used to measure elevation and angular displacements within the region covered by the rotating beam.

Altman, in U.S. Pat. No. 3,669,548, discloses a method for determining a ship's heading or bearing, using an electro-optical angle measuring device that determines angles relative to a horizontal datum line. A plurality of parallel light beams, spaced apart by known, uniform distances and oriented at a known angle, forms a one-dimensional grid that covers the region where the ship is located. A rotating reflecting telescope on the ship has its axis aligned with one of the parallel light beams. The angle of the ship's longitudinal axis relative to the known direction of the parallel light beams is then easily read off to determine the ship's heading. This approach would not be suitable where the ship or other body whose angular orientation is to be determined can move over a large region.

Remote measurement of rotation angle of an object of interest by use of polarized light and electro-optical sensors is disclosed by Weiss et al in U.S. Pat. No. 3,877,816. The intensity of light transmitted serially through two linear polarization filters is proportional to the square of the cosine of the angle between the two polarization directions, and the proportionality constant can be determined by experiment. Unpolarized light transmitted along a first reference path with fixed polarization directions is compared with unpolarized light transmitted along a second, spatially separated and optically baffled path in which the polarization direction of one polarizer may vary. One or two light polarizers in each light beam path rotates at a constant angular velocity, which is the same for each path, and the difference in phase of the two received light signals is a measure of the angle of rotation of a polarizer (or the body to which the polarizer is attached) in the first path and a polarizer in the second path.

An optical-electronic surveying system that also determines and displays the angular orientation of a survey pole relative to a local horizontal plane is disclosed in U.S. Pat. No. 4,146,927, issued to Erickson et al. The system can receive and process range measurements directly from an electronic distance meter located near the system.

U.S. Pat. No. 4,443,103, issued to Erdmann et al, discloses use of a retro-reflective, electro-optical angle measuring system, to provide angle measurements after interruption of a signal that initially provided such information. A light beam is split into two beams, which intersect on a scanning mirror, which rotates or vibrates about a fixed axis, and the two beams are received at different locations on a retro-reflective tape positioned on a flat target surface on the target whose rotation is to be measured. These two beams form a plane that moves as the scanning mirror moves, with a reference plane being defined by the mirror at rest in a selected position. The scanning mirror sweeps the plane of the two beams across the target surface. A rotation angle of the target surface relative to the reference plane is determined, based upon the time difference between receipt of light from each of the two retro-reflected beams. The beam interception times coincide only if an edge of the retro-reflective tape is parallel to the reference plane. If receipt of light from the two retro-reflected beams is displayed on a synchronized, two-trace oscilloscope screen, the two "blips" corresponding to receipt of these two beams will have a visually distinguishable and measurable time difference $\Delta t$, as indicated in FIGS. 2A, 2B and 2C of the Erdmann et al patent. The time difference $\Delta t$ will vary as the scanning mirror moves. A second Erdmann et al U.S. Pat. No. 4,492,465, discloses a similar approach but with different claims.

"Total station" electronic instrumentation for surveying, and more particularly for measurement of elevation differences, is disclosed by Wells et al in U.S. Pat. No. 4,717,251. A rotatable wedge is positioned along a surveying transit line-of-sight, which is arranged to be parallel to a local horizontal plane. As the wedge is rotated, the line-of-sight is increasingly diverted until the line-of-sight passes through a target. The angular displacement is then determined by electro-optical encoder means, and the elevation difference is determined from the distance to the target and the angular displacement. This device can be used to align a line-of-sight from one survey transit with another survey transit or to a retro-reflector. However, the angular displacement is limited to a small angular sweep, such as 12°.

U.S. Pat. Nos. 4,667,203, 5,014,066 and 5,194,871, issued to Counselman, disclose methods for measuring the baseline or separation vector between two survey marks, using GPS carrier phase signals. These methods use radiowave interferometric analysis of carrier phase signals received from many GPS satellites. This often requires observation time intervals of substantial length ($\approx$5000 seconds) for the baseline vector determination, with reported inaccuracies less than 5 cm.

In U.S. Pat. Nos. 4,924,448 and 5,231,609, Gaer discloses a method for using GPS signals for ocean bottom mapping and surveying. Two ships, each with a GPS station (GPS antenna and receiver/processor) travel parallel routes a fixed distance apart. The first ship transmits a sonic signal toward a location on the ocean bottom, and the specularly reflected portion of this signal is received and analyzed to determine the location of the portion of the ocean bottom that reflected the signal.

Fodale et al disclose an electro-optical spin measurement system for use in a scale model airplane wind tunnel in U.S. Pat. No. 4,932,777. Optical targets (six) to receive and sense one or several light beams are located under the fuselage at the nose tip, on each of two sides of the fuselage, and under each wing tip, and a plurality of optical receivers are positioned on the perimeter of the wind tunnel to receive light from the optical targets at various angles, to determine airplane angle of attack and roll angle. The time-synchronized signals received at each receiver are recorded for subsequent analysis.

In U.S. Pat. No. 4,954,833, issued to Evans et al, information on deflection of the local vertical (obtained from gravity measurements) is combined with geodetic azimuth estimated from GPS signals to obtain an astronomical azimuth. This azimuth can be used for ballistic projectile delivery to a selected target. This method does not focus on integration of GPS operation with theodolite operation but, rather, seeks to avoid use of a theodolite to obtain the astronomical azimuth.

Kroupa et al, in U.S. Pat. No. 4,988,189, disclose use of a passive rangefinding system in combination with an electro-optical system, using image information obtained at two or more electro-optical system positions. A method for simultaneously measuring the difference between orthometric (geoidal) height and height above a given ellipsoid for a site on the Earth's surface is disclosed by Evans in U.S. Pat. No. 5,030,957. Two or more leveling rods are held at fixed, spaced apart locations, with a known baseline vector between the rods. Each levelling rod holds a GPS signal antenna, receiver and processor that determines a GPS location for each rod. The geometric height of the GPS antenna (or of the intersection of the rod with the Earth's surface) is determined for each rod, and the geometric height difference is determined, using standard GPS survey measurements (accurate to within a few centimeters). A comparison of the orthometric height, usually found using a spirit level, and the height above the ellipsoid, obtained from a GPS measurement, provides a measure of the local gravitational field. The patent does not indicate, or perhaps recognize, advantages of use of height information to aid the GPS carrier phase initialization process but treats the GPS and the levelling rods as separate, non-interacting systems.

Ohishi et al disclose an optical distance measuring instrument using light transmitted and returned by retro-reflection in U.S. Pat. No. 5,054,911. A light beam pulse generated at the instrument is split into two pulses; one pulse is immediately received by a laser diode as a reference pulse. The other pulse is transmitted to a retro-reflector at a remote or adjacent target and returned to the instrument by retro-reflection thereat. The returning pulse is received by an optical fiber, having a known time delay $\Delta t$ and then received by the laser diode to provide a second pulse. The time delay $\Delta t$ is subtracted from the difference of arrival times of the two pulses and divided by 2c (c=ambient medium light velocity) to obtain the distance from instrument to target.

A somewhat unclear disclosure of a beam alignment apparatus and method is presented in U.S. Pat. No. 5,060,304, issued to Solinsky. Two substantially identical beam acquisition apparati are spaced apart from each other, each apparatus including two identical parabolic mirrors with parallel axes, each mirror having an axial aperture through which an electromagnetic wave beam passes and having a second smaller mirror located at the parabola's focal point. Each parabolic mirror has a third mirror consisting of a plurality of small retro-reflectors, located adjacent to but behind the parabolic mirror so that the parabolic mirror lies between the second and third mirrors. One parabolic mirror in each pair receives light from a transmitter positioned behind the mirror aperture and transmits this beam in a direction parallel to the mirror axis. The other parabolic mirror in each pair receives an incident beam propagating parallel to its axis and reflects this light to a receiver located behind the mirror aperture. One of the parabolic mirror pairs is operated in a search mode (moving) at a first selected frequency f1. The second parabolic mirror pair is operated in a "stare" mode at a selected frequency $f2 \neq f1$. As the two mirror pairs come close to alignment with each other, the mirror pairs sense this by receipt of a retro-reflected beam or a directly transmitted beam, the distinction being made by the frequency of the beam received. The search mode mirror pair, and then the stare mode mirror pair, can then be brought into alignment with each other.

A surveying instrument that uses GPS measurements for determining location of a terrestrial site that is not necessarily within a line-of-sight of the surveyor is disclosed in U.S. Pat. Nos. 5,077,557 and 5,233,357 issued to Ingensand and to Ingensand et al. The instrument uses a GPS signal antenna, receiver and processor, combined with a conventional electro-optical or ultrasonic range finder and a local magnetic field vector sensor, at the surveyor's location. The range finder is used to determine the distance to a selected mark that is provided with a signal reflector to return a signal issued by the range finder to the range finder. The magnetic field vector sensor is apparently used to help determine the surveyor's location and to determine the angle of inclination from the surveyor's location to the selected mark.

U.S. Pat. No. 5,101,356, issued to Timothy et al, discloses a moving vehicle attitude measuring system that mounts three GPS signal antennas, each attached to a GPS receiver/processor, in a non-collinear configuration on the vehicle at predetermined distances from each other. The phases of rf signals arriving at the antennas are compared to determine the angular orientation of the plane containing the three antennas, and the angular orientation of the vehicle that carries these antennas.

Method and apparatus for measuring the relative displacement of two objects, applicable to monitoring of movement of adjacent material along an earthquake fault, is disclosed in U.S. Pat. No. 5,112,130, issued to Isawa. First and second optical distance measuring instruments (ODMIs) are placed at known locations astride a selected line (e.g., a fault line). First and second optical reflectors, also astride the selected line, are spaced apart by known distances from the first and second ODMIs. Distances from the first ODMI to the second reflector and from the second ODMI to the first reflector are measured ab initio and compared with subsequent readings of these two distances. If one or both of these distances changes, the magnitudes of the changes are used to determine how far the Earth on one side of the line has moved relative to the Earth on the other side of the line, as might occur in a slip along a fault line.

U.S. Pat. No. 5,142,400, issued to Solinsky, discloses a method for line-of-sight acquisition of two optical beam transceivers suitable for use in satellite communications. A first beam transceiver has an optical retro-reflector and initially operates in a passive or "stare" mode, with its beam transmitted in a fixed direction. A second transceiver performs a search over $2\pi$ steradians with its optical beam until it receives, from the first transceiver, either (1) a return of its own beam or (2) a distinguishable beam from the first transceiver. Boresight alignment is then maintained after beam-to-beam acquisition.

Ghaem et al disclose an electronic direction finder that avoids reliance on sensing of terrestrial magnetic fields for establishing a preferred direction for satellite signal acquisition in U.S. Pat. No. 5,146,231. The apparatus uses a receiver/processor for GPS or similar navigation signals received from a satellite, and requires (stored) knowledge of the present location of at least one reference satellite from which signals are received. The orientation of the finder or its housing relative to a line of sight vector from the finder to this reference satellite is determined. This orientation is visually displayed as a projection on a horizontal plane. Any other direction in this horizontal plane can then be determined with reference to this projection from a knowledge of the reference satellite location.

U.S. Pat. No. 5,146,290, issued to Hartrumpf, discloses apparatus for determining the position and angular orientation of an object. A partially silvered hemispherical light reflector is fixed to some part of the object, and two spaced apart laser beams are directed to intersect at the hemisphere center, to be (partly) retro-reflected at the hemisphere reflector surface, and to return toward the laser sources, to be detected by photodetectors located adjacent to each laser source. A portion of the beam from each laser source is transmitted through the hemispherical reflector and is received by a line or plane of photodetectors positioned on a plane behind the hemispherical reflector. As the object is translated or rotated, the locations where the reflected and transmitted beams are received by the photodetector arrays changes in a manner that can be related to the translation and/or rotation of the object.

In U.S. Pat. No. 5,155,490, issued to Spradley et al, a method using three fixed-location GPS base stations for geodetic surveying is disclosed. Long observation time intervals are used to determine receiver clock drift at each GPS station. A mobile GPS station then determines its location with enhanced accuracy using the network of these fixed base stations with known locations.

Ferguson et al disclose a method for surveying using a rotary wind aircraft in U.S. Pat. No. 5,182,566. An initial location of a GPS station mounted on the aircraft is initially determined with high accuracy. The GPS station is then moved to a desired survey point while maintaining lock on the signals being received from GPS satellites.

Method and apparatus for determination of the roll, pitch and azimuth orientation angles for a survey instrument by analyzing GPS carrier phase signals is disclosed by Knight in U.S. Pat. No. 5,296,861. A direct phase integer search to resolve the ambiguities for the carrier phase integers is performed, using a maximum likelihood to identify one or more acceptable solutions.

Blume discloses a survey or identification system to allow a space platform to distinguish between a friendly object and an unfriendly object in U.S. Pat. No. 5,382,957. The platform, which includes a GPS receiver/processor and antenna, transmits an encrypted interrogation signal to the object, which can be positioned tens or hundreds of kilometers from the platform, requesting certain information including the location coordinates of the object. Simultaneously, the platform uses high directivity radar and line of sight measurements to estimate the object range and the object location coordinates, using the platform's GPS-based knowledge of its own location. A friendly object will reply to the encrypted interrogation signal with an authenticating reply, including the GPS-determined location coordinates of the object. A receiver on the platform receives the object location coordinates from the object and compares these coordinates with its own estimate of the object location coordinates. If the object-supplied object location is within a determinable distance of the platform-supplied object location and all other authenticating replies from the object are appropriate, the platform authenticates the object as a "friendly" object.

Method and apparatus for GPS-assisted airborne surveying, which uses differential GPS corrections and which compensates for the thermal inertia of the object being surveyed, is disclosed in U.S. Pat. No. 5,445,453, issued to Prelat. Two airborne surveys are conducted at spaced apart times to assess the effects of maximum and minimum radiation temperatures on the object being surveyed.

A theodolite and tape have traditionally been used to measure horizontal and vertical angles and distances in terrestrial surveying. More recently, digital theodolites, as described in U.S. Pat. No. 3,768,911, issued to Erickson, and electronic distance meters (EDMs), as described by Hines et al in U.S. Pat. No. 3,778,159, have supplanted the theodolite and tape approach. Combination of an optical angle encoder and an EDM in an integrated package (called an "electronic total station"), as disclosed in U.S. Pat. No. 4,146,927, issued to Erickson et al, has led to automation of field procedures, plan production and design work.

Several limitations exist in use of a conventional total station. First, it is difficult to quickly establish the angular orientation and absolute location of a local survey or datum. Many surveys are not related to a uniform datum but exist only on a localized datum. In order to accurately orient a survey to a global reference, such as astronomical north, a star observation for azimuth is often used that requires long and complicated field procedures. Second, if a survey is to be connected to a national or state geodetic datum, the survey sometimes must be extended long distances, such as tens of kilometers, depending upon the proximity of the survey to geodetic control marks. Third, the electronic total station relies upon line-of-sight contact between the survey instrument and the rodman or pole carrier, which can be a problem in undulating terrains.

These systems do not provide the benefits of an integrated SATPS and terrestrial total station instrument. What is needed is a system that provides: (1) rapid azimuth and location determination in a fixed reference frame; (2) prompt resolution of the carrier phase ambiguities that occur in a SATPS; (3) distance and angle information without requiring line-of-sight contact between a reference station and a mobile station; (4) flexibility and fail-safe capability for cross-checking, and calibrating the respective error sources in, the location information provided by the SATPS and by the terrestrial positioning system; and (5) capability for accounting for height differences between the geoid and ellipsoid over the local survey area.

SUMMARY OF THE INVENTION

These needs are met by the invention, which provides a surveying system that combines Satellite Positioning System (SATPS) techniques with new and with known survey techniques. The apparatus includes a first or instrument survey station that provides a reference for the survey, a second or mobile survey station that is spaced apart from the first station and acts as a mobile measurement unit for the survey. Each of these stations receives SATPS signals and determines its location using these signals. More than one mobile station can be used simultaneously with one instrument station.

The instrument survey station includes a first Satellite Positioning System (SATPS) antenna and first SATPS receiver/processor, connected together, for receiving SATPS signals, representing pseudorange or carrier phase, from two or more satellites and for determining the instrument station location according to the SATPS signals. The instrument station also includes an instrument station communications antenna, connected to the first SATPS receiver/processor, for transmitting or receiving station location and satellite attribute information. The instrument station also includes an electronic distance meter (EDM) and digital theodolite, whose spatial orientation can be varied arbitrarily, connected to the first SATPS receiver/processor, for transmitting electromagnetic waves having a selected wavelength and for determining the distance from the instrument station to the mobile station by receipt of a return electromagnetic signal from the mobile station, for determining the elevation difference, if any, between the instrument station and the object, and for determining the angular displacement between a line drawn from the instrument station to the object and a selected reference line.

The mobile survey station includes a second SATPS antenna and second SATPS receiver/processor, connected together, for receiving SATPS signals, representing pseudorange or carrier phase, from two or more SATPS satellites and for determining the mobile station location according to the SATPS signals. A mobile station communications antenna, connected to the second SATPS receiver/processor, for communicating with the instrument station communications antenna and for transmitting to the instrument station a signal containing feature and attribute information and information on the location of the mobile station as determined by the SATPS satellite signals, is also included in the mobile station. The mobile station also includes an electronic distance meter responder, adapted to receive the electromagnetic waves transmitted by the electronic distance meter and to provide a return electromagnetic signal that is received by the electronic distance meter at the instrument station. The instrument station communication means and the mobile station communication means are connected by a data link for transferring information from one station to the other station.

In a first embodiment, the location of the mobile station is initially known with high accuracy and the second SATPS receiver/processor is adapted for subsequently determining the difference, if any, between the "known" pseudorange or carrier phase signals the mobile station should receive at its known location, and the corresponding signals actually received at the mobile station. These corrections are used at the mobile station, or transmitted to the instrument station, to enhance the accuracy of the computed location of one or both of these stations.

In a second embodiment, a remote station whose location is known with high accuracy is added. The remote station includes a third SATPS antenna and third SATPS receiver/processor, connected together, for receiving SATPS signals, representing pseudorange or carrier phase, from two or more SATPS satellites and for determining the location of the remote station according to the SATPS signals. A remote station communications antenna, connected to the third SATPS receiver/processor, to communicate with the instrument station communication means and/or with the mobile station communication means and to transmit to at least one of these stations a signal containing location and attribute information, as determined by the SATPS satellite signals, is also included in the remote station. The location of the remote station is known with high accuracy. The SATPS signal receiver/processor at the remote station is adapted for determining the difference, if any, between the "known" pseudorange or carrier phase signals the remote station should receive at its known location, and the pseudorange or carrier phase signals actually received at the remote station.

The invention provides a "total SATPS station", including first and second spaced apart SATPS stations whose relative separation is known with high accuracy, as an integrated supplement to survey equipment conventionally used. Each of the first and second SATPS stations includes an SATPS antenna and SATPS receiver/processor that receive signals from two or more SATPS satellites and process these signals to partly or fully determine the position of the receiving SATPS antenna. The first and second SATPS antenna and associated SATPS receiver/processor may be retrofitted within first and second housings, respectively, that contain conventional first and second electro-optical survey instruments, respectively, used to determine the bearing, length of, and/or height difference of a separation vector joining the two electro-optical survey instruments. Differential corrections are provided for the SATPS signals received at the instrument survey station and/or at the mobile survey station, to increase the accuracy of, or to correct, the location determined for that station.

The invention uses certain electro-optical survey measurements, implemented by use of one or more signal retro-reflectors that operate in the microwave, infrared, visible or ultraviolet wavelength ranges, to determine the bearing, length of, and/or height difference of a separation vector joining the first and second stations. This requires that the two stations have line-of-sight visual contact. The primary object is to implement carrier phase positioning (accurate to within a few centimeters), as opposed to the less accurate code phase positioning, using the SATPS satellite signals. Carrier phase positioning is implemented by causing two or more SATPS stations to track a common group of SATPS satellites. The measurements are then merged and either processed in real time, or post-processed, to obtain data useful in determination of the location of any stationary or mobile SATPS station near an SATPS instrument station. Real time positioning requires transfer of SATPS data between a instrument station and a mobile station, using a data link that need not rely upon line-of-sight communication.

One problem that must be overcome initially in use of carrier phase positioning is the presence of phase integer ambiguities in the carrier phase measurements for the tracked satellites. An integer search technique for identification of the phase integers often takes account of the statistical nature of discrete integer combinations that are realistic candidates for the proper phase integers. The number of possible combinations to be searched is enormous, unless the number of candidates can be reduced ab initio. If the relative location of two SATPS stations is known precisely, the number of initial phase integer combination candidates can be reduced to as few as one. If the horizontal or vertical separation distance between the two stations is known with high accuracy in the SATPS frame, the number of phase integer combination candidates can be reduced to a modest number that can be searched relatively quickly and can reliably produce the correct results. The number of phase integer combination candidates is reduced by sequentially applying position information provided by the electro-optical survey measurements Another serious problem with carrier phase positioning is the possibility of SATPS signal interruptions at one or both SATPS stations. When a SATPS satellite signal is lost, the phase integer(s) must be redetermined. Signal interruption can easily occur in urban or other built-up areas where tall structures interfere with or produce multipath SATPS signals. A separation vector between two SATPS stations, specified by three coordinate differences, or by a vector magnitude and two or more spherical angles relative to a fixed direction, may be known initially. However, one or both of these stations may have moved when the signal is interrupted so that the separation vector must be established again.

The invention provides a separation vector, between the two stations by use of one or more wave retro-directors that are mounted on the second station and facing the first station. An electromagnetic wave beam ("light beam") is directed from the first station toward the second station, and the beam is retro-reflected from the second station toward the first station. The station-to-station separation vector is obtained by electro-optical phase measurement techniques. Once the separation vector is re-established, after an SATPS signal interruption occurs, the phase integer combination for the two station is promptly redetermined, and static or kinematic surveying can continue.

Several benefits accrue from this total station approach: (1) rapid azimuthal angle determinations can be made; (2) use of differential SATPS information supplements and improves the accuracy of the survey parameters that can be measured; (3) SATPS signal processing can be done at the instrument station or at the mobile station; (4) where the frequency of the station-to-station data link is selected appropriately, or where one or more signal repeaters are used to relay signals between the two stations, survey measurements are not limited to line-of-sight measurements from instrument station to a mobile station, once the phase integer ambiguities are resolved; and (5) systematic and random errors in the SATPS and electro-optical measurements can be determined and reduced by combining the information from the two systems.

DESCRIPTION OF BEST MODE OF THE INVENTION

Figure 1:
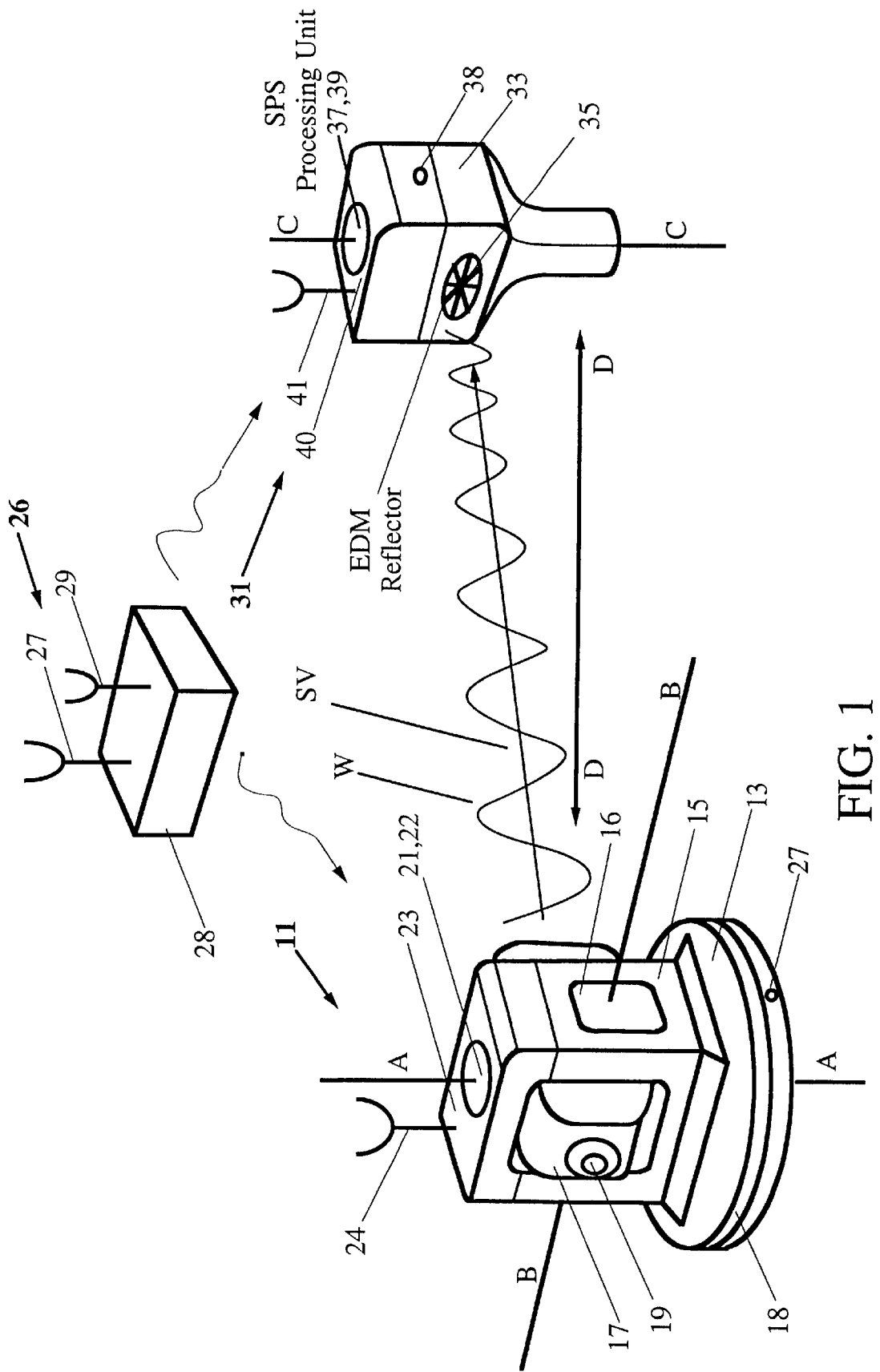
FIG. 1 is a perspective view of one embodiment of the components used for the instrument station and mobile station according to the invention.

FIG. 1 illustrates many of the components included in an SATPS instrument station 11 and an SATPS mobile station 31 according to one embodiment of the invention. The instrument station 11 includes a plate 13 mounted on a tripod or other stable structure (not shown) and rotatable about an approximately vertical first axis AA that passes through the plate 13. A second body 15, referred to as the alidade, is mounted on a top surface of the plate 13 and is either rotatable about the first axis AA with respect to the plate 13 or rotates with the plate 13 about the first axis AA. A third body 17 is positioned adjacent to or surrounded by the alidade 15 and rotates about an approximately horizontal second axis BB, referred to as the trunnion or horizontal axis, with respect to the alidade 15. The third body 17 includes an EDM 19 that may be aimed or pointed in an arbitrary direction (over a hemisphere with included solid angle approximately $2\pi$ steradians) with the aid of rotations of the first, second and third bodies about the first and second axes AA and BB. In one embodiment, the EDM 19 relies upon electro-optical principles and emits electromagnetic waves W with a fixed wavelength $\lambda$ that is known to high accuracy. The waves W are reflected at, or otherwise interact with, the mobile station 31, and a return signal from the mobile station is used to determine the distance from the instrument station 11 to the mobile station 31.

The instrument station 11 determines the horizontal or azimuthal angle $\theta_h$ of an instrument station orientation line DD in the local horizontal plane with respect to a fixed reference line RR (shown in FIG. 6 for improved clarity), such as true north. The instrument station 11 also determines the vertical or polar angle $\theta_v$ of the separation vector (of length d) between the line DD and the separation vector that joins the instrument station and the mobile station 31.

The instrument station 11 further includes an SATPS signal antenna 21, which may form part of a handle or other structure for the instrument 11, that receives SATPS signals from two or more satellites that are part of a Satellite Positioning System. The SATPS signals received by the SATPS antenna 21 are passed to an SATPS receiver/processor 22 that analyzes these signals and determines the location of the antenna. The SATPS signal receiver/processor 22 (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90.

The instrument station 11 also includes a first station communication means, including a first transmitter, receiver or transceiver 23 and first communications antenna 24, for transmitting information to and/or receiving information from the mobile station 31, and a common data output port 25.

The mobile station 31 includes a fourth body 33 that is mounted on a tripod, prism pole or other stable structure (not shown) and is rotatable about an approximately vertical third axis CC. Normally, the axes AA and CC are each aligned to the local gravitational force vector so that AA and CC are parallel to each other only for very small separations between the instrument station 11 and the mobile station 31. The fourth body 33 includes an EDM responder 35 that responds to incident electromagnetic waves, such as W, and produces a return signal (preferably electromagnetic) that is received and understood by the EDM 19. The EDM 19 and the EDM responder 35 work cooperatively to determine the distance or range from the instrument station 11 to the mobile station 31 and/or an angle between the station separation vector and a selected reference line, such as a true north line passing through the instrument station. The azimuthal angle (horizontal) and polar angle (vertical) for the separation vector are determined using an optical encoder that is included in the digital theodolite.

The mobile station 31 also includes a second SATPS signal antenna 37 and a second SATPS signal receiver/processor 39, connected together, that also receive SATPS signals from two or more SATPS satellites and determine the location of the second SATPS antenna from these SATPS signals. The mobile station 31 may include a common data output port 38 for first or second station location information. The mobile station 31 also includes a second transmitter, receiver or transceiver 40 and second communications antenna 41 that allows communication between the instrument station 11 and the mobile station 31.

In a first mode of operation, the system also includes a remote station 26, whose location; preferably fixed, is known with high accuracy. The remote station 26 includes a third SATPS signal antenna 27 and a third SATPS signal receiver/processor 28 that receive SATPS signals, make code phase and/or carrier phase measurements and compare the pseudorange or carrier phase of the remote station indicated by these SATPS signals with the pseudorange or carrier phase that should be measured at the remote station at corresponding times. The remote station 26 transmits pseudorange or carrier phase correction information to the instrument station 11 and mobile station 31, using a third communications antenna 29. This correction information may include the unprocessed code phase and carrier phase information plus corrections to this information, based upon the known location of the remote station 26. The instrument station 11 and mobile station 31 then use the remote station measurements, instrument station and mobile station location information, and the local SATPS measurements, to more accurately determine the location of the first SATPS antenna 21, the location of the second SATPS antenna 37, and/or the location of the second SATPS antenna 37 relative to the location of the first SATPS antenna 21. In this mode of operation, the instrument station 11 and the mobile station 31 separately determine their respective locations, using the correction information received from the remote station 26.

In a second mode of operation, similar to the first mode, the mobile station 31 transmits its uncorrected, SATPS-determined location and/or time coordinates and/or height of mobile station and relevant status information (such as meteorological data and remaining battery charge) to the instrument station 11, using the first and second communications antennas 24 and 41. Alternatively, the mobile station 31 transmits its uncorrected pseudorange or carrier phase measurements to the instrument station 11. The instrument station 11 receives the location and/or time coordinates, or the pseudorange or carrier phase values, from the mobile station 31 and computes corrected location and/or time coordinates for the second SATPS antenna 37, using the SATPS correction information received by the instrument station from the remote station 26. In this mode of operation, the second SATPS receiver/processor 39 at the mobile station 31 may be replaced by a simple receiver, if the mobile station does not compute its uncorrected location and/or time coordinates for transmission of this information to the instrument station 11.

In a third mode of operation, the roles of the instrument station 11 and of the mobile station 31 in the second mode are partly reversed. The instrument station 11 transmits its uncorrected location and/or time coordinates and/or height of instrument station, or uncorrected pseudorange or carrier phase measurements, to the mobile station 11. The mobile station 11 then computes corrected location and/or time coordinates for the first SATPS antenna 21, using the SATPS correction information received by the instrument station from the remote station 26. In this mode of operation, the first SATPS receiver/processor 22 at the instrument station 11 may be replaced by a simple receiver, if the instrument station does not compute its uncorrected location and/or time coordinates for transmission of this information to the mobile station 31.

In a fourth mode of operation, the remote station 26 is deleted, and the mobile station 31 receives the SATPS signals, determines the range or pseudorange correction information from these signals, and transmits this information to the instrument station 11 for correction of the SATPS-determined pseudorange or carrier phase signals and of the location and/or time coordinates of the instrument station 11 and of the mobile station 31.

In a fifth mode of operation, the roles of the instrument station 11 and of the mobile station 31 in the fourth mode are partly reversed. The mobile station 31 transmits its uncorrected pseudorange and/or carrier phase information to the instrument station 11, and the instrument station corrects the mobile station pseudorange signals and/or carrier phase signals and computes the corrected location and/or time coordinates for the mobile station, and for itself.

In the fourth and fifth modes of operation, the location of the mobile station 31 (or of the instrument station 11) is initially determined by applying a baseline approach to a spatial separation vector between the two stations. This initial location is less accurately known than the location of the remote station used in the first three modes of operation.

Figure 2:
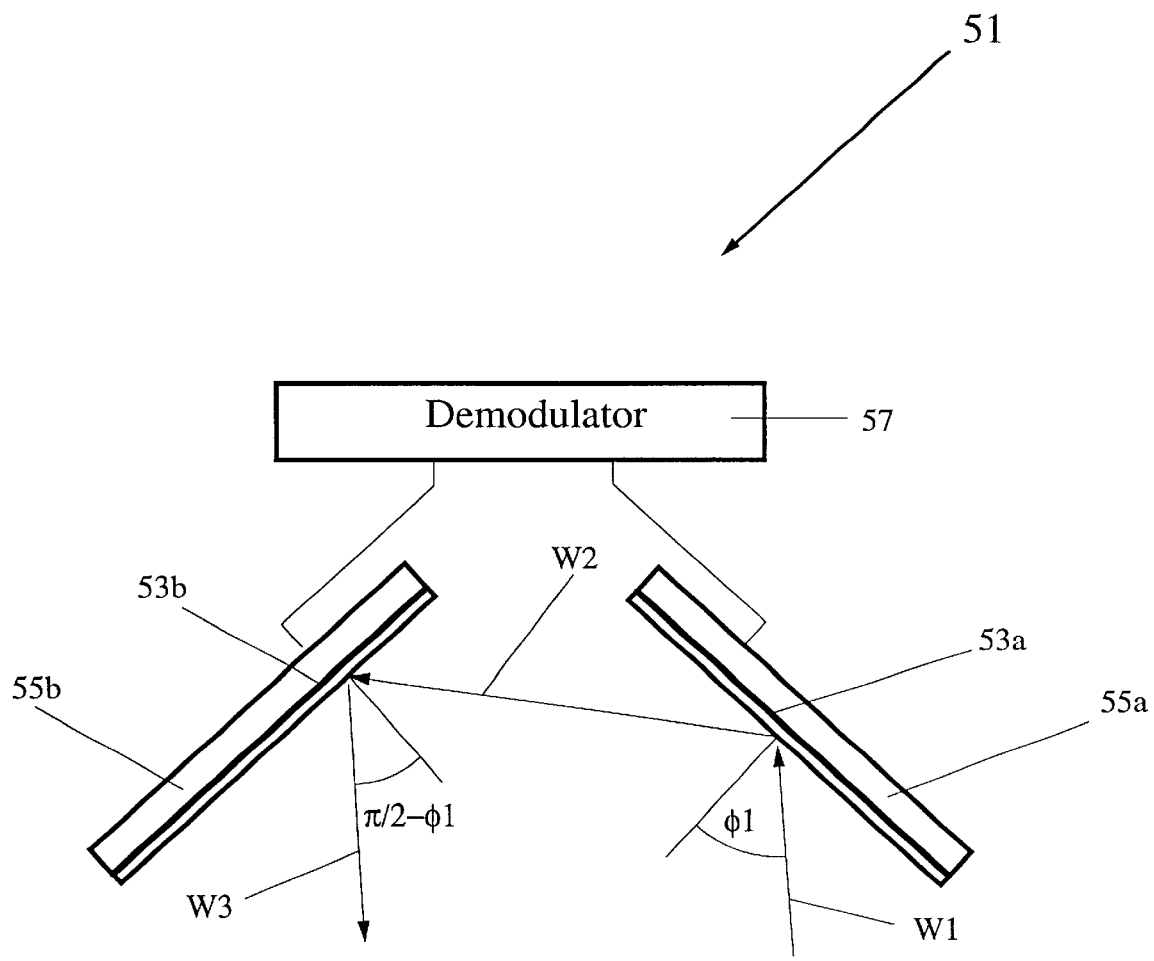
FIG. 2 is a schematic view of a retro-reflector used at the mobile station or the instrument station according to one embodiment of the invention.

FIG. 2 illustrates one suitable EDM responder 35 for the mobile station 31 in FIG. 1, an electromagnetic wave retro-reflector 51 that includes two highly reflective surfaces 53a and 53b that are oriented perpendicularly to each other. Alternatively, the retro-reflector 51 may include an array of antenna components 53a/53b that receives an incident electromagnetic wave at a microwave or infrared frequency and produces a retro-directed wave that proceeds away from the retro-reflector 51 in the opposite direction, as illustrated in U.S. Pat. No. 4,985,707, issued to Schmidt and Kadim, incorporated by reference herein.

An incident electromagnetic wave W1 approaches the first surface/array 53a at an arbitrary incidence angle $\phi 1$, is reflected as a wave W2 that approaches the second surface/array 53b, and is reflected by this second surface/array as a wave W3 at a reflectance angle $\pi/2-\phi 1$. The wave W3 thus moves away from the retro-reflector 51 in the same direction as, but oppositely directed to, the direction of approach of the incident wave W1. The incident wave W1 is thus returned toward the EDM 19 in FIG. 1 as an anti-parallel wave W3. The EDM responder 35 may be an optical retro-reflector of well known design if the incident electromagnetic wave W1 has a wavelength that lies in the near-infrared, visible or ultraviolet range. If the incident wave W1 has a far-infrared or microwave or longer wavelength, the EDM responder 35 may be an array of antenna elements for retro-direction of the incident wave, as indicated above.

Figure 3A:
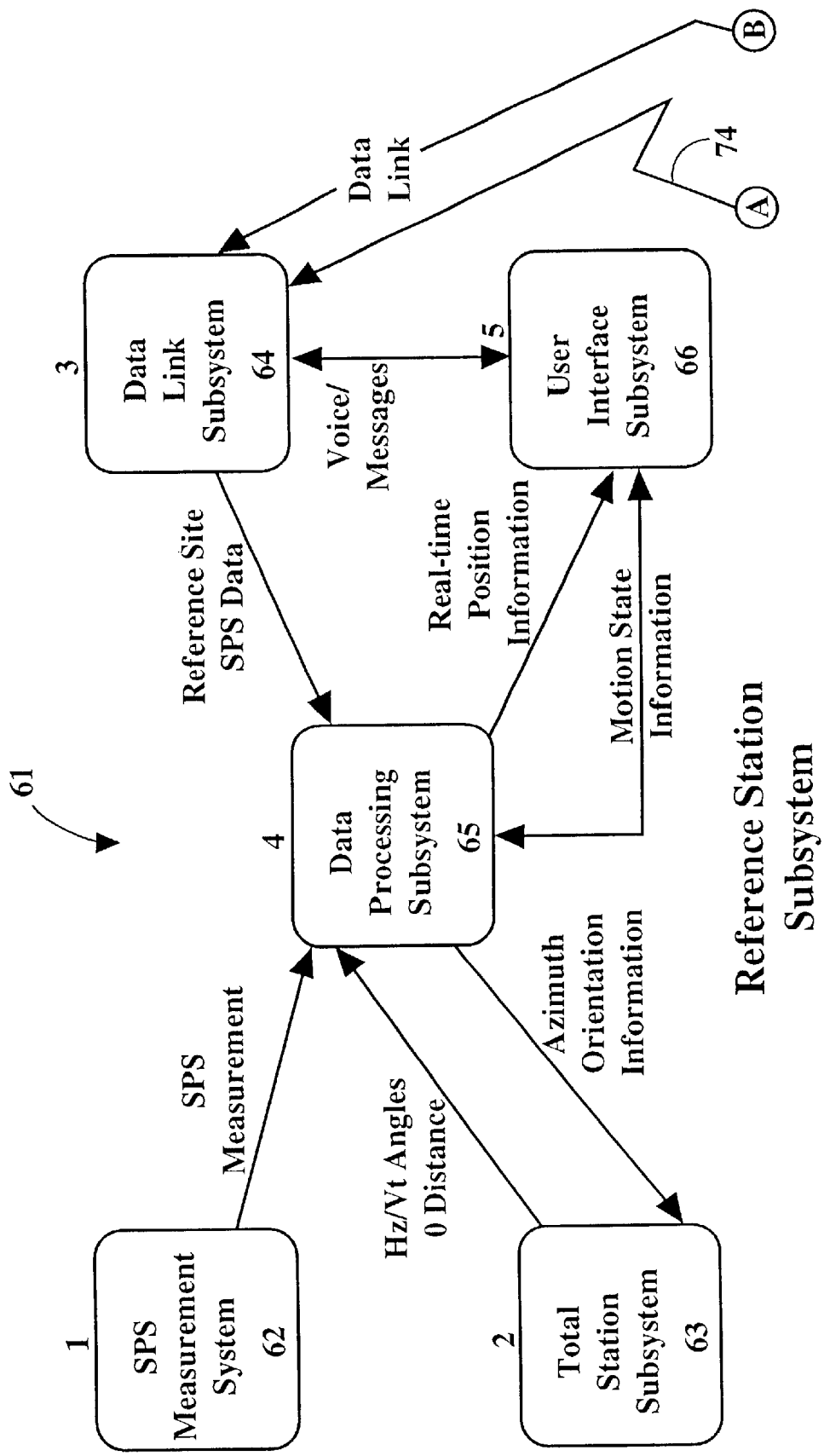
FIGS. 3A, 3B and 3C are schematic views of a signal processing system used for the instrument station, for the mobile station and for the remote station according to one embodiment of the invention.
Figure 3B:
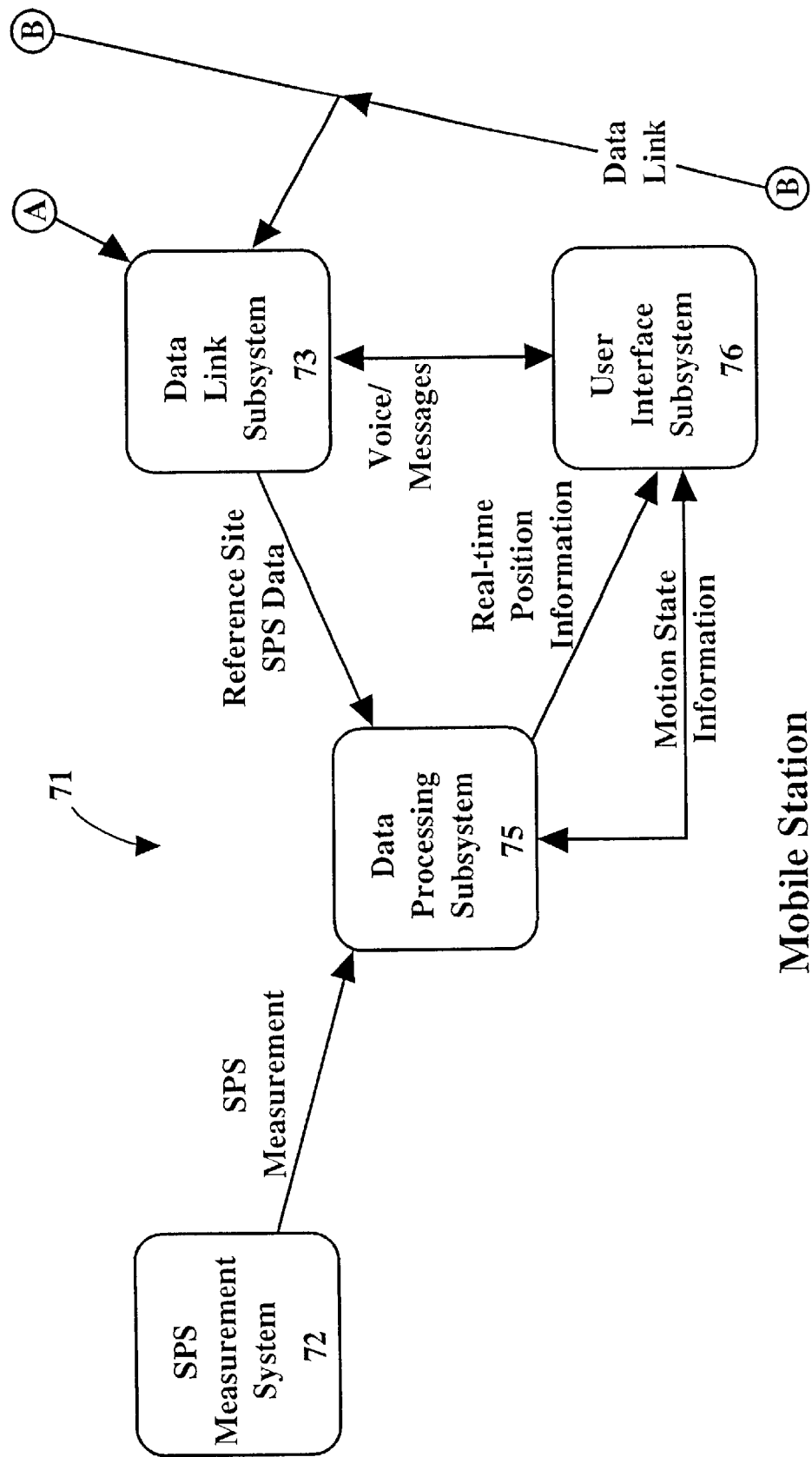

FIGS. 3A and 3B illustrate one embodiment of the system 61 of the instrument station 11 and of the system 71 of the mobile station 31, respectively. The instrument station system 61 includes: (1) an SATPS measurement subsystem 62 that receives SATPS satellite signals and computes or otherwise determines or computes the SATPS-determined location of the first SATPS antenna 21 (FIG. 1); (2) a total station subsystem 63 that includes the EDM 19 and provides horizontal and/or vertical distance and/or angular displacement information and/or azimuthal displacement information for the mobile station 31 relative to the instrument station 11; (3) a data link subsystem 64 that receives SATPS location information from and/or transmits SATPS location information from the mobile station 31; (4) a data processing subsystem 65 that receives information from the subsystems 62, 63 and/or 64 and provides information on the location of the mobile station 31 relative to the instrument station 11; and (5) a user interface subsystem 66 that receives information from the data processing subsystem 65 and displays and stores this information in a useful format or formats for a person performing survey activities at the instrument station 11.

The mobile station system 71 shown in FIG. 3B includes: (1) an SATPS measurement subsystem 72 that receives SATPS satellite signals, makes carrier phase and code phase measurements, and determines the SATPS-determined location of the second SATPS antenna 37 (FIG. 1); (2) a data link subsystem 73 that receives SATPS location information from and/or transmits SATPS location information from the instrument station 11; (3) a voice message and/or data link 74 (optional) that connects the instrument station data link subsystem 64 with the mobile station data link subsystem 73 and allows the operators at the two stations to communicate with each other; (4) a data processing subsystem 75 that receives information from the subsystems 72 and/or 73 and/or 76 and provides information on the location of the mobile station 31; and (5) a user interface subsystem 76 that receives information from the data processing subsystem 75 and displays and stores this information in a useful format or formats for a person performing survey activities at the mobile station 31.

The data link element 74 shown in FIG. 3B may be implemented in several ways. A first implementation introduces modulation into the optical wave or radiowave W used for sighting of the mobile station 31 from the instrument station 11 (FIG. 1). With reference to FIG. 2, if the wave W is optical, the reflecting surfaces 53a and 53b are each provided with an electrically sensitive backing 55a and 55b, respectively, that sense these modulations on the optical wave W and transfer these sensed modulation signals to a signal demodulator 57 that demodulates and determines the content of these signals. Because the incident wave W1 and reflected wave W2 will be intercepted by each of the two reflectors 53a and 53b, each of the two sensitive backing layers 55a and 55b should sense substantially the same modulated signal; and either or both of these sensed modulation signals can be used by the demodulator 57. As one alternative, the modulation signals sensed by the sensitive backing layer 55b can be used as an error check for the modulation signals sensed by the sensitive backing layer 55a. If the wave W is a radiowave, the modulations introduced into the wave W can be sensed by one or more of the antenna elements in the retro-directing antenna array and, again, demodulated by a signal demodulator.

A second implementation of the data link element 74 shown in FIG. 3B uses a radio link established by the antennas 25 and 41 and associated transmitters and receivers 24 and 40, as illustrated in FIG. 1. This data link has the advantage that the link can provide one-way or two-way communication between the instrument station 11 and the mobile station 31.

Figure 3C:
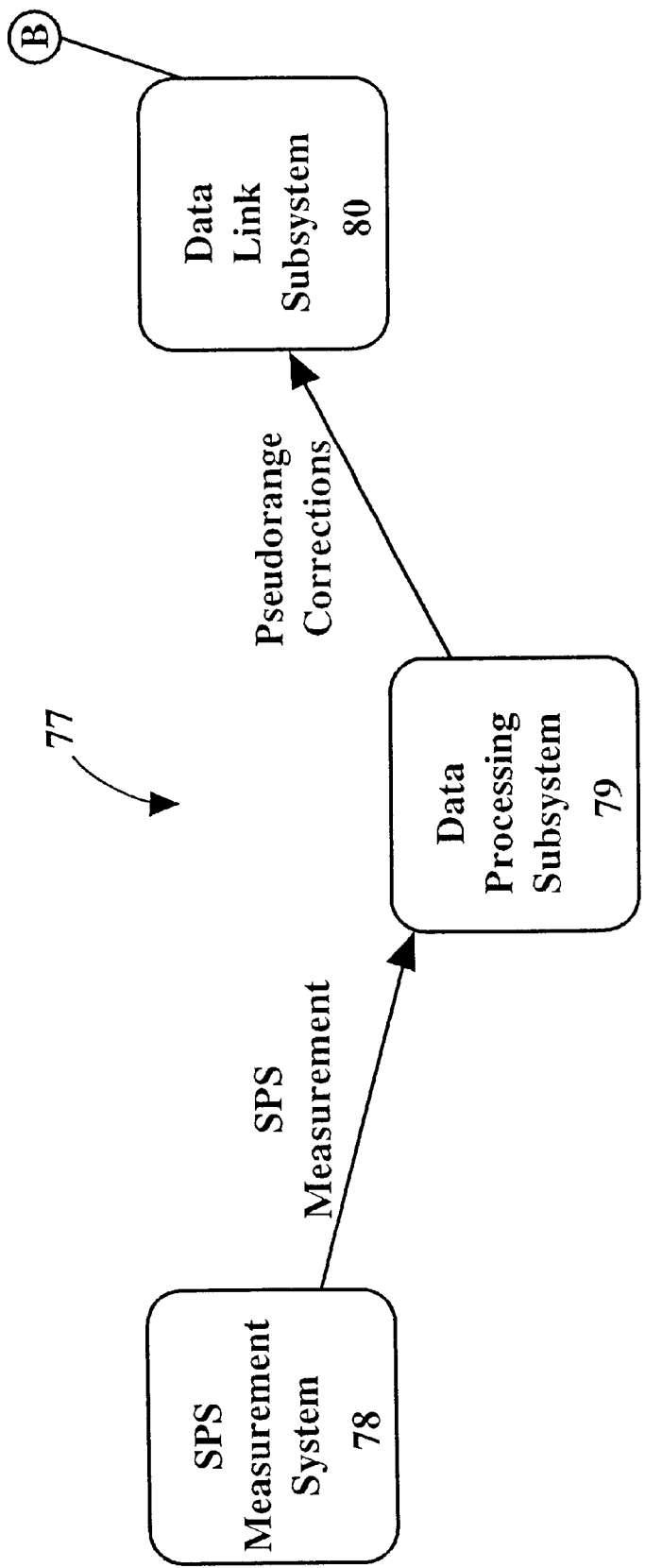

Several approaches can be adopted for data receipt and processing in the embodiment shown in FIGS. 3A, 3B, 3C. In a first approach, the instrument station system 61 receives the SATPS signals (including satellite attributes information) through its SATPS measurement subsystem 72 and transmits these signals to the mobile station system 71, where the pseudorange (or carrier phase) for each visible SATPS satellite at the instrument station and at the mobile station are computed, the mobile station corrections (=known pseudorange or carrier phase—SATPS-determined pseudorange or carrier phase) are computed, and the SATPS-determined instrument station pseudoranges and/or carrier phases are corrected using the mobile station corrections.

In a second approach, the mobile station system 71 receives the SATPS signals through its SATPS measurement subsystem 72 and transmits these signals and its known pseudorange and/or carrier phase values to the instrument station system 61, where the SATPS-determined pseudoranges and/or carrier phases of the instrument station and of the mobile station are computed, the mobile station corrections are computed, and the SATPS-determined instrument station pseudoranges and/or carrier phases are corrected using the corresponding mobile station corrections. The known pseudoranges and/or carrier phases of the mobile station can be transmitted from the mobile station 71 to the instrument station 61, or this known pseudorange or carrier phase information can be stored in the SATPS measurement subsystem 62 or in the data processing subsystem 65 of the instrument station system 61.

In a third approach, the instrument station system 61 receives the SATPS signals through its SATPS measurement subsystem 62, determines the instrument station pseudoranges and/or carrier phases, and transmits the SATPS-determined instrument station pseudorange and/or carrier phase information to the mobile station system 71. At the mobile station system 71, the SATPS-determined mobile station pseudoranges and/or carrier phases are computed, the mobile station correction are computed, and the SATPS-determinedinstrument station pseudoranges and/or carrier phases are corrected using the mobile station corrections.

In a fourth approach, each of the instrument station system 61 and the mobile station system 71 receives pseudorange and/or carrier phase corrections, computed for a nearby SATPS remote station system 77, shown in FIG. 3C, that has an SATPS signal antenna 78, an SATPS signal receiver/processor 79 and a communications transmitter 80 to communicate with the instrument station 61 and with the mobile station 71. In this approach, the remote station system 77 provides pseudorange and/or carrier phase correction information, and the locations of the instrument station system 61 and of the mobile station system 71 need not be initially determined by an accurate survey.

Figure 4A:
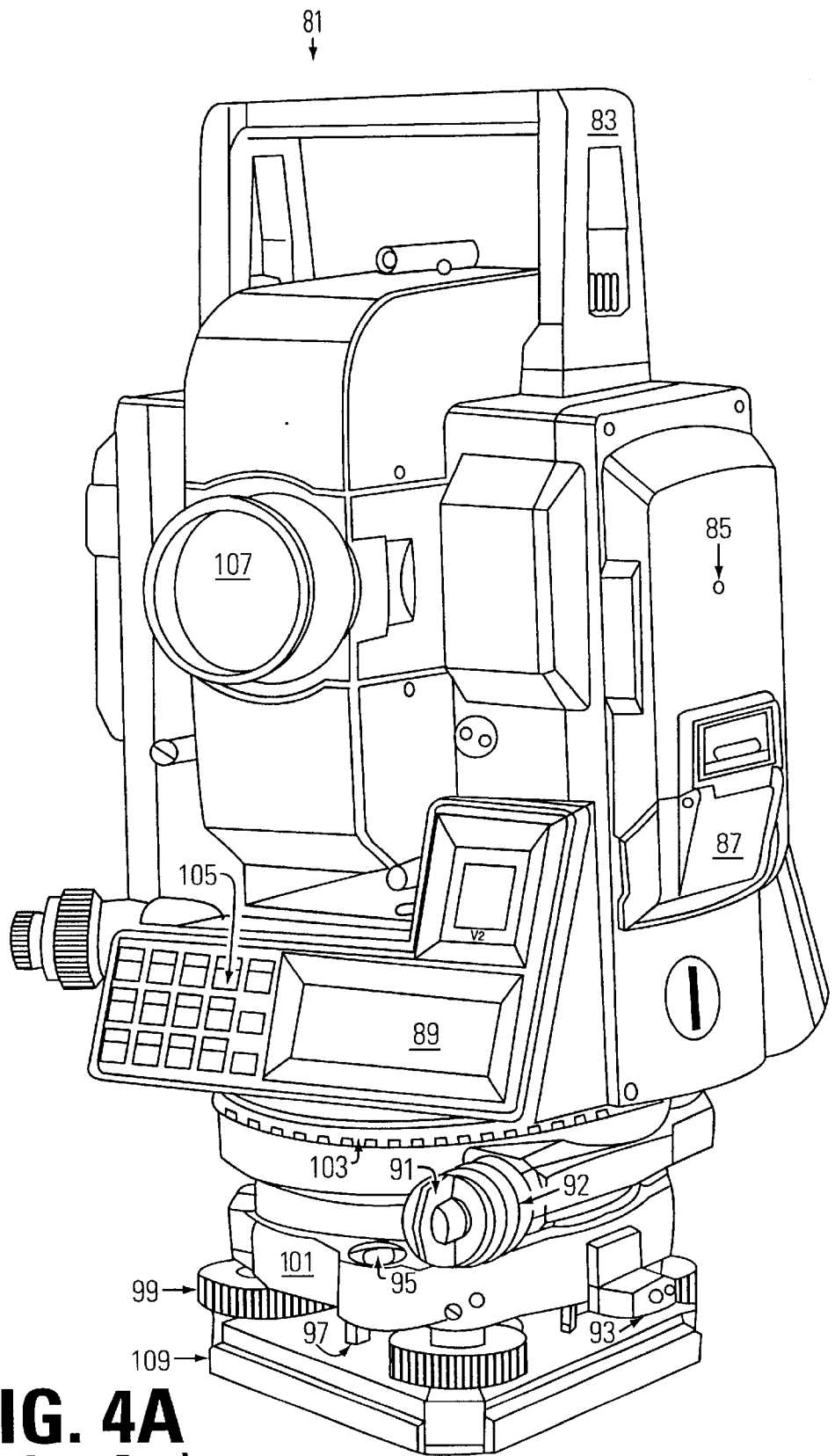
FIGS. 4A and 4B are front and back perspective views of a conventional electro-optical instrument that determines the horizontal bearing, vertical angle and length of a vector joining this instrument with a second instrument that responds to receipt of an electromagnetic wave from the first instrument by returning a signal to the first instrument.
Figure 4B:
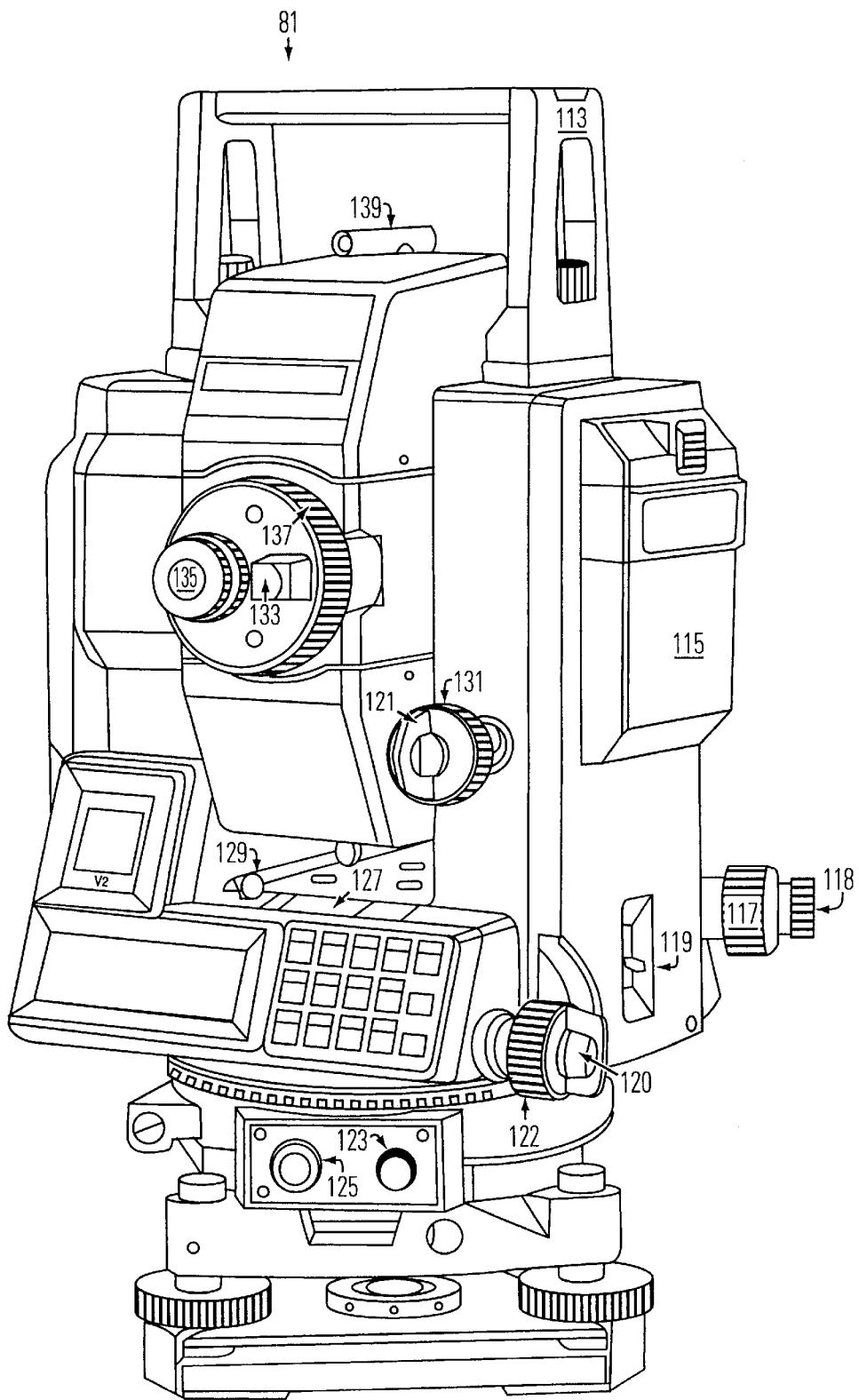

FIGS. 4A and 4B are front and back views, respectively, of a representative conventional electronic total station 81 from the prior art. The front view in FIG. 4A illustrates a carrying handle 83, instrument height mark 85, electronic memory card and cover 87, alphanumeric display 89, clamps 91, 92 and 93, circular level 95 with associated level adjusting screws 97, level adjusting foot screws 99, Tribach 101, horizontal circle positioning ring 103, keyboard 105 for data and instruction entries, an objective lens 107 for survey line-of-sight positioning, and a base plate 109. The back view (operator side) of the station 81 in FIG. 4B illustrates a slot for a tubular compass 113 in the handle 83, a battery or other power supply 115, an optical plummet focusing ring 117 and focusing eyepiece 118, a power switch 119, a horizontal clamp 120, a vertical clamp 121, a horizontal fine motion adjustment screw 122, a data output electronic connector 123, an external power supply connector 125, a horizontal plate level 127 and adjusting screw 129, a vertical fine motion adjustment screw 131, a telescope transitting knob 133, a telescope eyepiece 135 (connected with the objective lens 107 in FIG. 4A), a telescope focussing ring 137, and a peep sight 139 for further viewing of a scene in which a survey measurement will be made.

Figure 5:
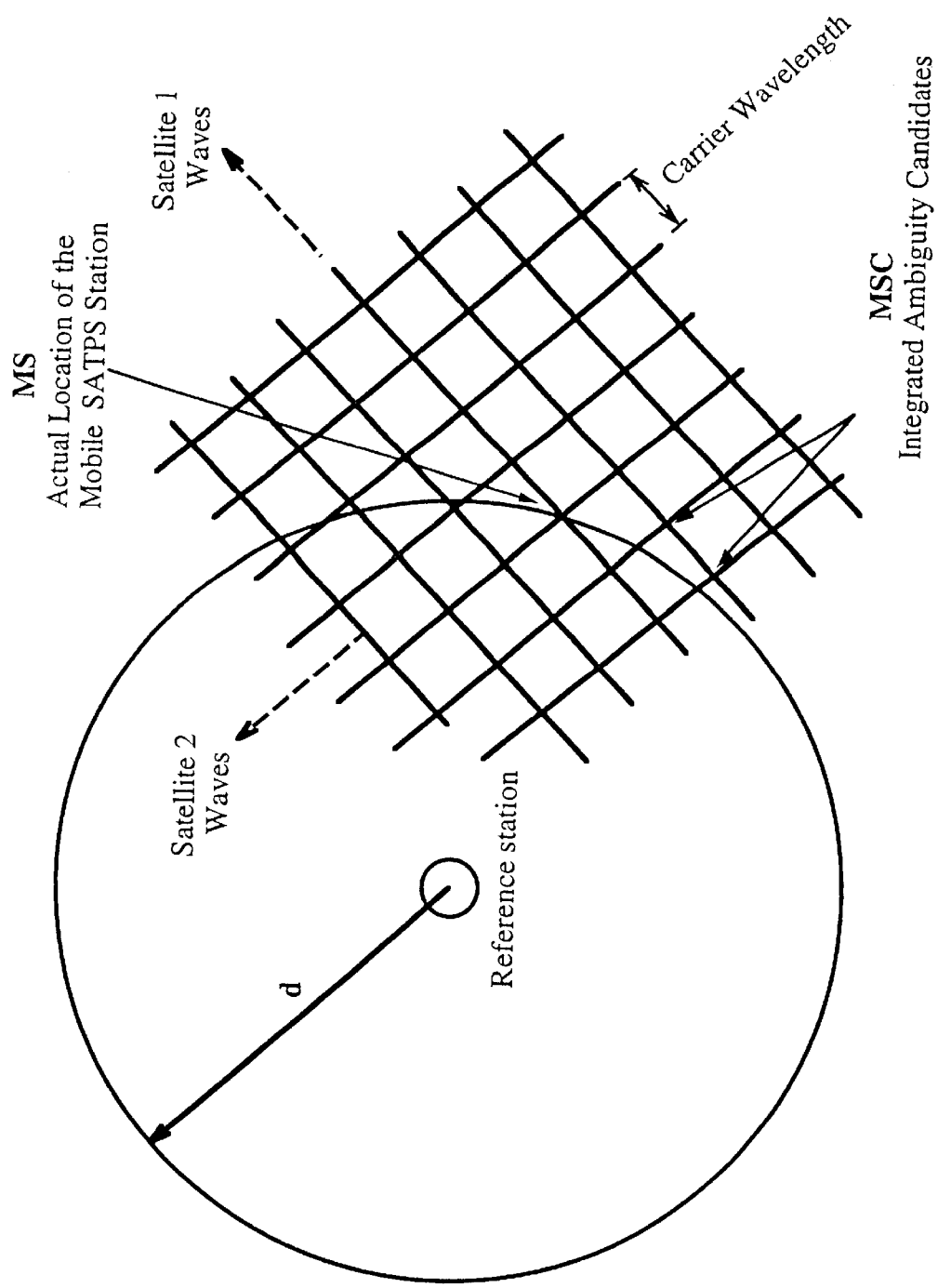
FIG. 5 illustrates how phase integer ambiguities occur in an SATPS.

SATPS carrier phase measurements contain an integer phase ambiguity that must be resolved to obtain centimeter-level accuracies on station location. FIG. 5 illustrates two intersecting wavefront sequences arising from carrier waves received from two SATPS satellites, the actual location MS of a mobile station antenna 37, and several adjacent other candidates MSC for the mobile station location. An EDM and digital reading of vertical slope between the instrument and mobile stations provides valuable information for resolution of these integer phase ambiguities. The known distance d shown in FIG. 6 between the instrument station antenna 21 and the mobile station antenna 37 limits the integer search region for the integer phase ambiguities to a sphere of radius d. In practice the distance d will be known only within a small uncertainty $\pm\Delta d$, and the search region becomes a volume between two concentric spheres of radius $d\pm\Delta d$.

Figure 6:
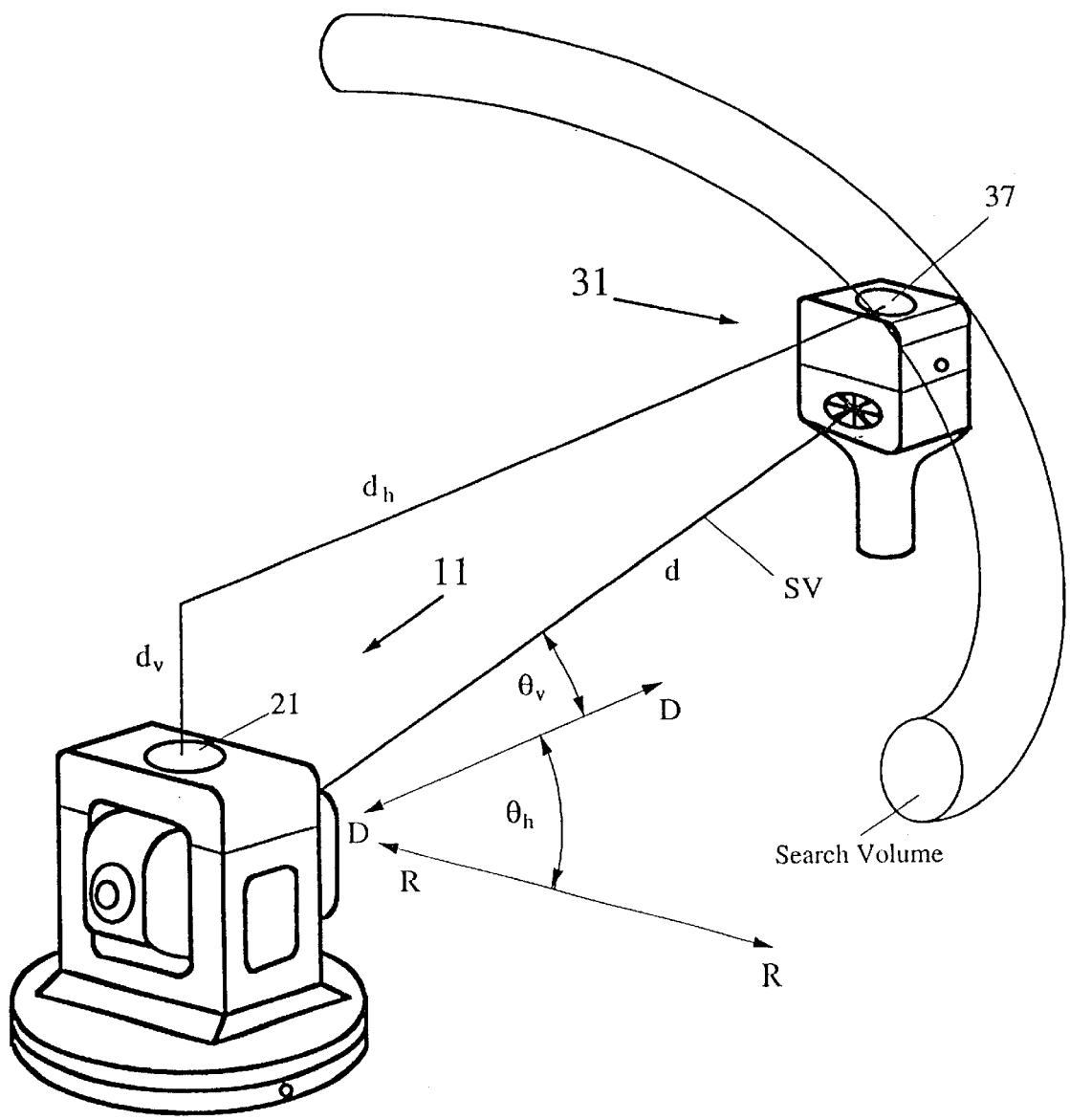
FIGS. 6 and 7 illustrate reductions in search volume for the correct carrier phase integers that are available with the invention in two approaches.

The search region is further reduced by applying the known height difference $d_v$ between the two antennas 21 and 37, which is determined from knowledge of the distance d and the vertical angle $\theta_v$ relative to a line DD in FIG. 6. In practice, the vertical angle $\theta_v$ will have a small uncertainty $\pm\Delta\theta_v$ associated with it. The search can now be limited to an annular region defined by intersection of the two concentric spheres of radius $d\pm\Delta d$ and the region between two cones having a common apex at the instrument station antenna 21 and apex angles equal to $\pi/2-(\theta_v\pm\Delta\theta_v)$. An angular displacement $\theta_h$ between a reference line RR and the line DD can used to re-establish lost satellite lock.

Figure 7:
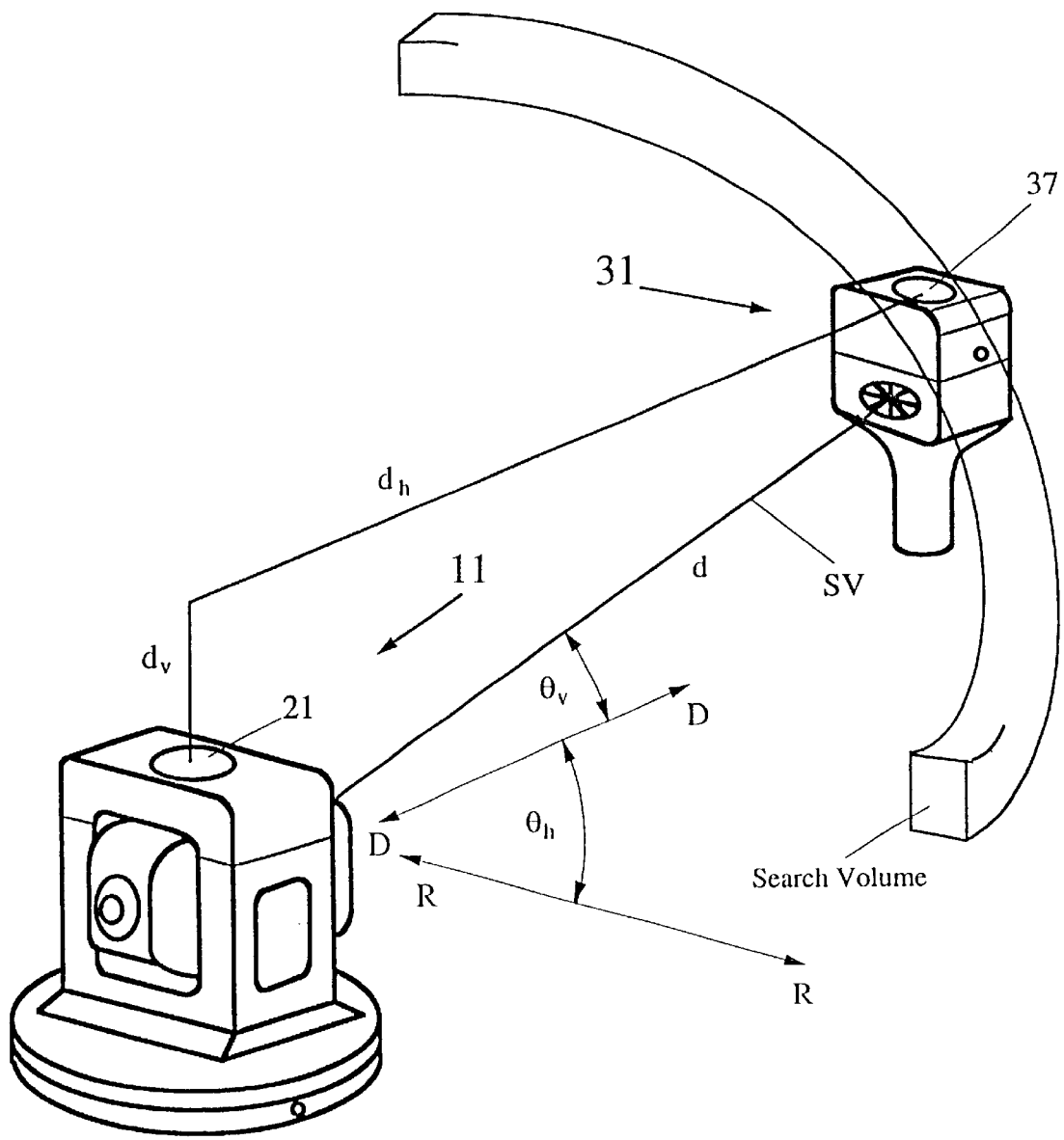

The height difference between the instrument and mobile stations 11 and 31 are related to the geoid, while the SATPS measurements are related to a fixed ellipsoidal reference system. Unless the coordinate differences between the geoid system and this reference system have been determined beforehand, the antenna height difference $d_v$ must also take account of the uncertainties, if any, in the geoid-ellipsoid reference systems. As long as the separation distance d is small ($\leq 10$ km), the geoid-ellipsoid height difference should be no more than a few centimeters in reasonably flat terrain. The integer search region might be approximated by an ellipsoid, as in FIG. 6, or by a curvilinear parallelepiped, as in FIG. 7.

Further reduction in the integer search region may be realized by taking advantage of the available differential SATPS code measurements, which provide an unambiguous estimate of the mobile station location relative to the instrument station, with an inaccuracy of no more than about five meters. The accuracy of the code-based location solution governs the resulting size of the integer search region, which is now reduced to a sector of the ellipse of revolution, as illustrated in FIG. 6. Only those carrier phase integer ambiguity combinations that fall within the sector indicated in FIG. 6 are considered as candidates. The integer combination with the smallest dispersion is preferably chosen as the correct combination. If the correct integer combination is not immediately apparent from a single measurement epoch, additional satellite geometries over the course of time may be used to average out errors and to further eliminate incorrect integer combinations.

One of the first references to discuss ambiguity resolution techniques in a GPS context is Counselman and Gourevitch, "Miniature Interferometer Terminals for Earth Surveying: Ambiguity and Multipath with Global Positioning System", I.E.E.E. Trans. on Geoscience and Remote Sensing, vol. GE-19 (1981) pp.244–252. The published search algorithms rely on a statistical measure of the quality of different ambiguity integer combinations, in order to identify the correct ambiguities for the tracked satellites.

Some computational efficiencies have been incorporated in integer search algorithms disclosed by Hatch in U.S. Pat. Nos. 4,963,889 and 5,072,227, and by Euler and Landau in "Fast GPS Ambiguity Resolutions On-the-fly for Real-time Applications", Sixth International Geodetic Symposium on Satellite Positioning, Columbus Ohio, Mar. 17–20, 1992, incorporated by reference herein. Search techniques for ambiguity integers have also been disclosed where the distance between two SATPS receivers (e.g., at instrument and mobile stations) is known. The Hatch patents, U.S. Pat. No. 5,101,356, issued to Timothy et al, and U.S. Pat. No. 5,148,179, issued to Allison, incorporated by reference herein, discuss other techniques for resolution of integer ambiguities. The capability of tightly constraining the integer ambiguity search based upon height difference and separation distance of two SATPS antennas is particularly valuable here. Thus, several techniques exist for resolution of integer ambiguities, and such techniques can be applied here in performing carrier-phase positioning in the context of this invention.

Where no remote station with known location is available to provide differential SATPS pseudorange and/or carrier phase corrections for the instrument station 11 and the mobile station 31, these two stations can work cooperatively to initially determine their baseline or separation vector SV, using conventional electro-optical survey instrumentation (FIG. 1). With the components of the separation vector SV determined, a GPS baseline vector approach, such as disclosed by Counselman in U.S. Pat. Nos. 4,667,203, 5,014,066 and 5,194,871, discussed above, can be used to determine the absolute locations of the instrument and mobile stations. Alternatively, a baseline approach discussed by B. W. Remondi in "Using the Global Positioning System (GPS) Phase Observable for Relative Geodesy: Modeling, Processing and Results" (Ph.D. Thesis, May 1964, University of Texas at Austin, May 1984), pp. 68–85, can be used to provide the differential SATPS corrections.

An SATPS antenna, receiver/processor and other appropriate equipment can be retrofitted to, and even integrated into the housing for, the conventional electronic total station 81 shown in FIGS. 4A and 4B. For example, an SATPS antenna 21 of appropriate design and SATPS receiver/processor 22 can be incorporated in the top of the handle 83 in FIG. 4A, as suggested in FIG. 1. Alternatively, the SATPS receiver/processor can be positioned in the alidade 15 of FIG. 1 at any convenient place therein. A second antenna 24 and transceiver 23 for the instrument station 11 and a second antenna 41 and transceiver 40 for the mobile station 31 can be positioned at any convenient places on those stations, for communicating with each other. Preferably, the SATPS components and related communications components 21, 22, 23 and 24 on the instrument station 11 should share a common data port and a common power supply connector with the other instrument station components; and the SATPS components and related communications components 37, 39, 40 and 41 for the mobile station 31 should share a common data port and a common power supply connector with the other mobile station components.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the U.S.

Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of 0.1 f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, op cit, pp. 1–90.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon, op cit, pp. 33–90.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

What is claimed is:

1. Apparatus for improved accuracy in measuring survey parameters, the apparatus comprising:

a first station comprising:
- a first Satellite Positioning System (SATPS) antenna and first SATPS receiver/processor, connected together, for receiving SATPS signals from two or more in-view SATPS satellites, for measuring at least one of a pseudorange value and a carrier phase value of the first station relative to each of the in-view satellites from the SATPS signals received from each selected in-view satellite, and for determining location of the first station from the SATPS signals received; and
- an electronic distance meter, whose spatial orientation can be varied arbitrarily, connected to the first SATPS receiver/processor, for transmitting electromagnetic waves having at least one selected wavelength and for determining the distance from the first station to a selected object that is spaced apart from the first station by receipt of a return electromagnetic signal from the object, for determining the elevation difference between the first station and the object, and for determining an angular displacement between a line extending between the first station and the object and a selected reference line lying in a plane containing the first station; and a second station, spaced apart from the first station and comprising:
- a second SATPS antenna and second SATPS receiver/processor, connected together, for receiving SATPS signals from the in-view satellites, and for measuring at least one of a pseudorange value and a carrier phase value of the second station relative to each selected satellite; and
- an electronic distance meter responder with at least one electromagnetic wave retro-reflector that receives an incident electromagnetic wave from the first station and returns a return electromagnetic wave toward the first station in a direction approximately parallel to the direction from which the incident wave was received from the first station;

where at least one of the first station and the second station has a vertical axis sensing mechanism for sensing the direction of a substantially locally vertical axis, to assist in determining the elevation difference;

where at least one of the first station and the second station has a supplementary communications mechanism for transmitting the at least one pseudorange value or carrier phase value measured at the first station or at the second station, respectively; and a third station, acting as a reference measurement unit for the survey, where the third station is provided with at least one of a known pseudorange value and a known carrier phase value of the third station relative to each in-view satellite, the third station comprising:
- a third SATPS antenna and third SATPS receiver/processor, connected together, for receiving SATPS signals from the in-view SATPS satellites, for measuring at least one of a pseudorange value and a carrier phase value of the third station relative to each in-view satellite, and for computing at least one of (1) a pseudorange difference between the measured pseudorange value and the known pseudorange value for each selected satellite and (2) a carrier phase difference between the measured carrier phase value and the known carrier phase value for each selected satellite; and
- a third station communications mechanism, connected to the third SATPS receiver/processor, for receiving the at least one of the pseudorange value and the carrier phase value transmitted by the at least one of the first station and the second station, and for using the received at least one pseudorange value and carrier phase value, together with the at least one pseudorange difference and carrier phase difference for a corresponding selected satellite, to compute at least one of a corrected pseudorange value and a corrected carrier phase value for the at least one of the first station and the second station, wherein said third station and at least one of said first station and said second station have at least two in-view SATPS satellites in common, and said third station determines at least one of a corrected first station location and a corrected second station location, using said at least one of pseudorange value and carrier phase value received from at least one of said first station and said second station.

2. Apparatus according to claim 1, wherein said second station includes a handle by which said second station can be held and transported, and said second SATPS antenna is positioned in this handle.

3. Apparatus according to claim 1, wherein said third station includes a handle by which said third station can be held and transported, and said third SATPS antenna is positioned in this handle.

4. The apparatus of claim 1, wherein said second station further comprises a data output terminal, connected to at least one of said electronic distance meter or said second SATPS receiver/processor, to provide an output signal containing information on at least one of the following: (1) said location of said second station, as determined from said SATPS signals; (2) said location of said first station, as determined by said SATPS signals; (3) said distance from said second station to said first station; (4) said elevation difference between said second station and said first station; and (5) said angular displacement between said selected reference line and said line drawn from said second station to said first station.

5. The apparatus of claim 1, wherein at least one of said first station and said second station has a vertical axis sensing mechanism for sensing the direction of a substantially locally vertical axis, to assist in determining said elevation difference.

* * * * *